No. 685,104. Patented Oct. 22, 1901.
G. P. CLAPP.
NAIL MACHINE.
(Application filed Jan. 26, 1901.)
(No Model.) 7 Sheets—Sheet 1.
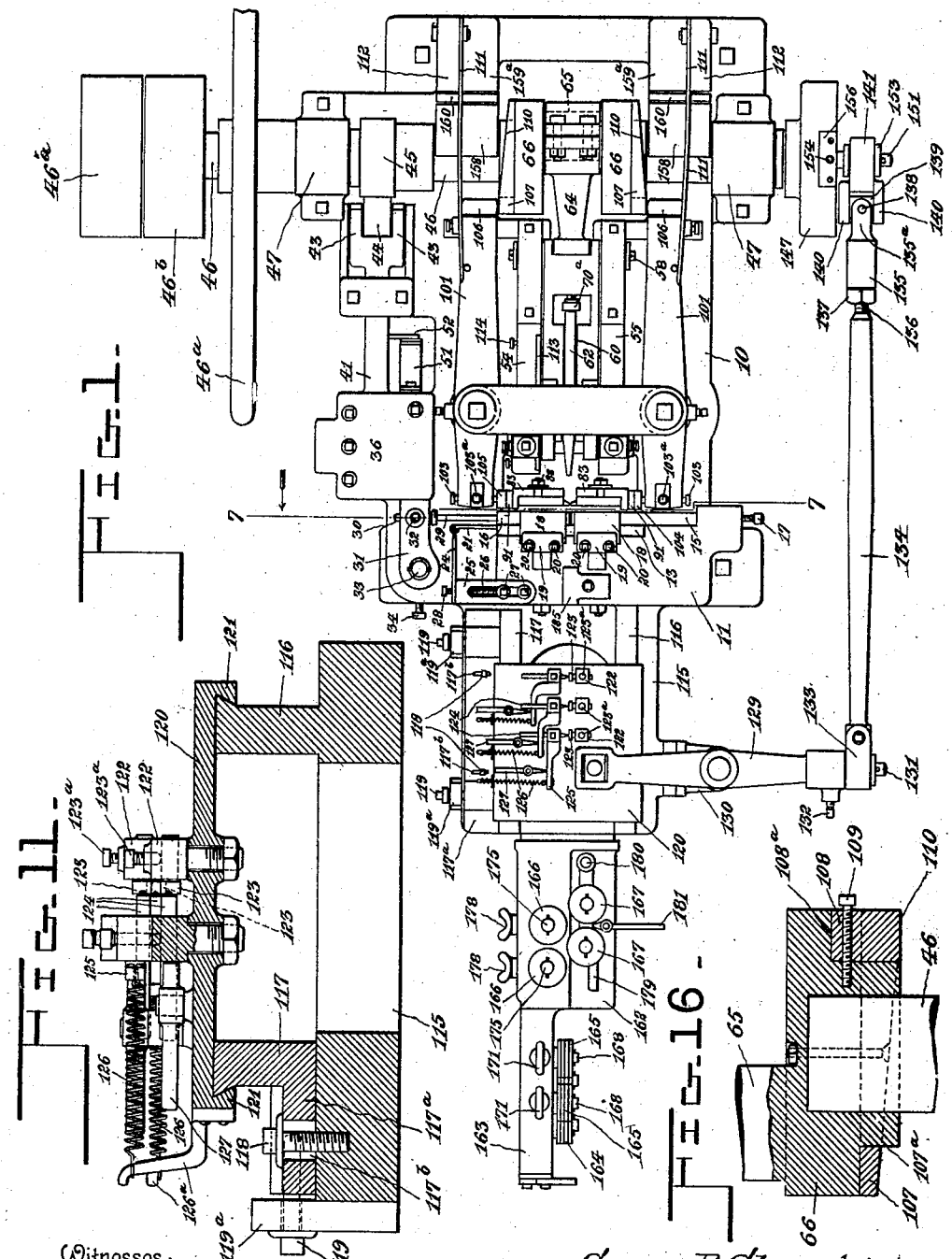
Witnesses:
George P. Clapp, Inventor
By Marion Marion
Attorneys No. 685,104.
Patented Oct. 22, 1901.
G. P. CLAPP.
NAIL MACHINE.
(Application filed Jan. 26, 1901.)
(No Model.)
7 Sheets—Sheet 2.
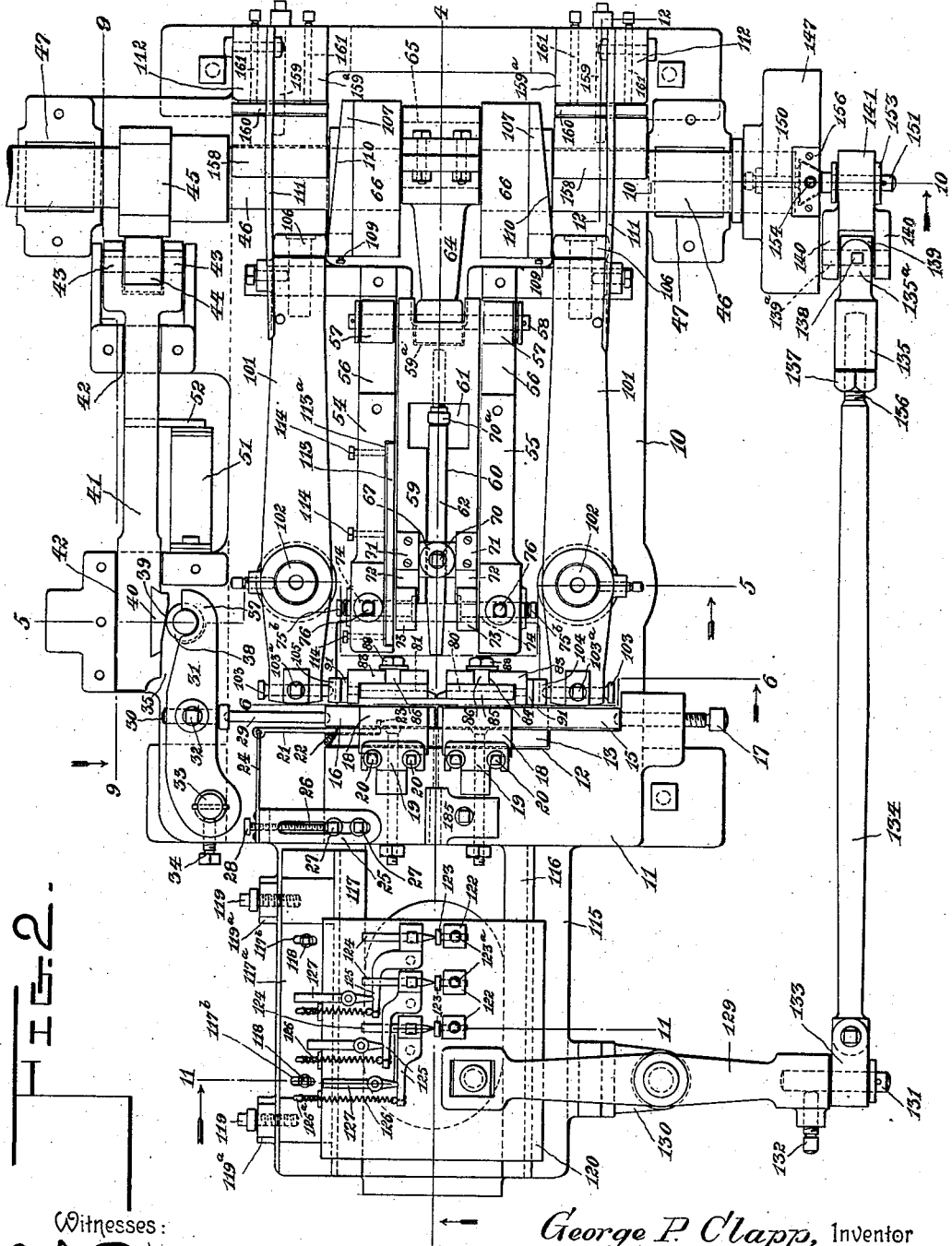
Witnesses:
John T. Deufferwiel
H. F. Bernhard
George P. Clapp, Inventor
By Marion & Marion
Attorneys

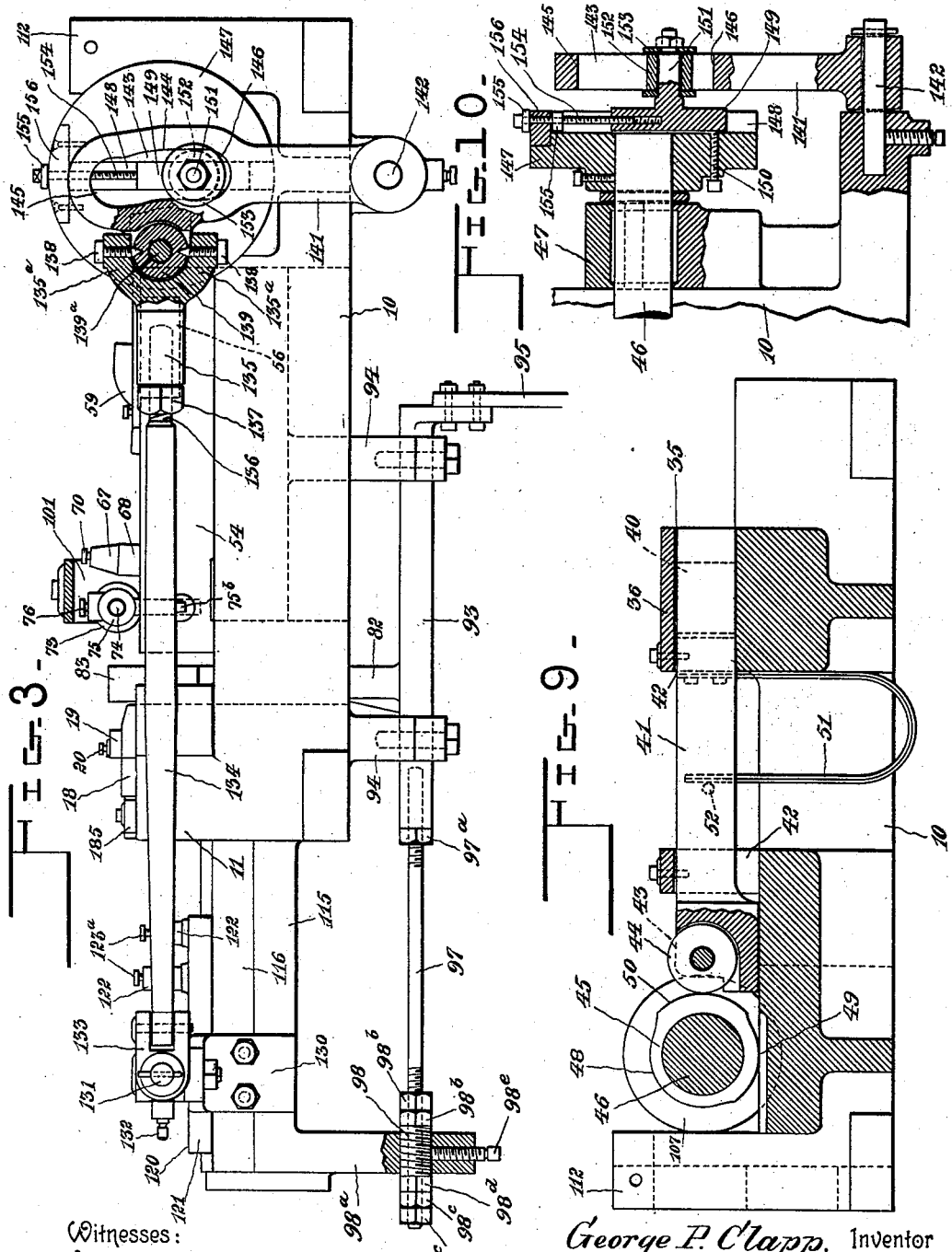

No. 685,104. Patented Oct. 22, 1901.
G. P. CLAPP.
NAIL MACHINE.
(Application filed Jan. 26, 1901.)
(No Model.) 7 Sheets—Sheet 4.
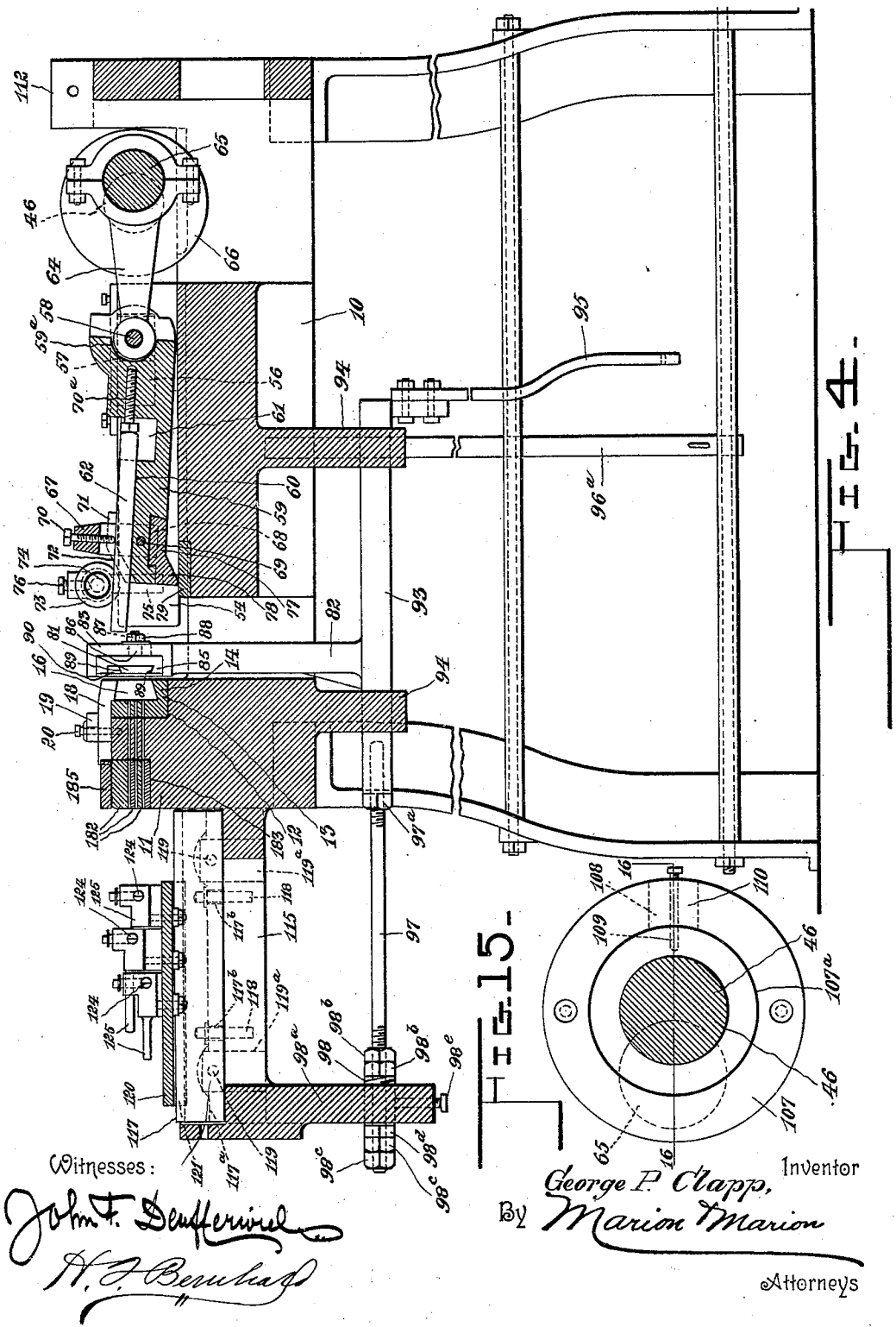

No. 685,104.  
G. P. CLAPP.  
NAIL MACHINE.  
(Application filed Jan. 26, 1901.)  
(No Model.)
Patented Oct. 22, 1901.
7 Sheets—Sheet 5.
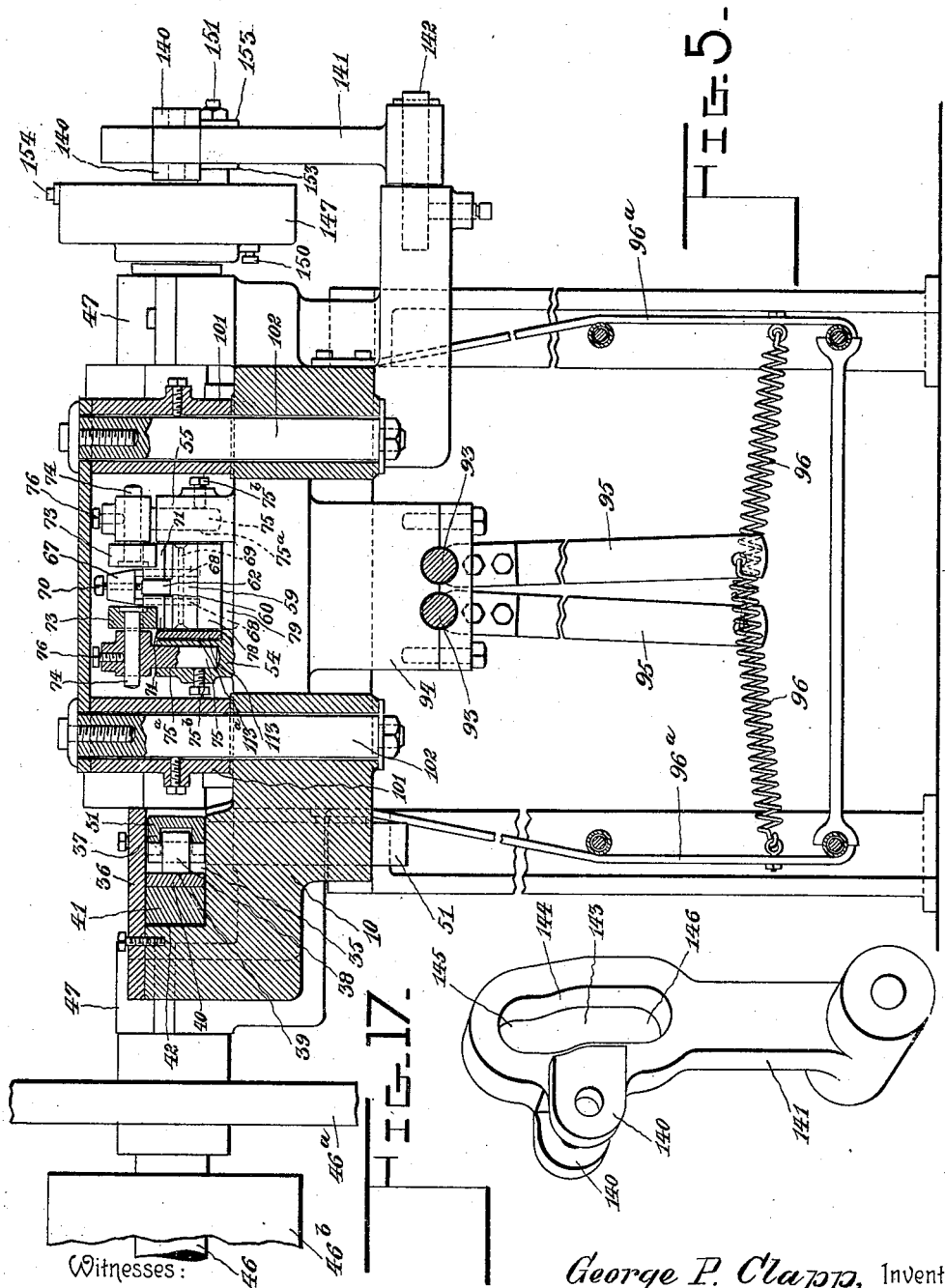
Witnesses:  
George P. Clapp, Inventor  
By Marion & Marion  
Attorneys No. 685,104. Patented Oct. 22, 1901.
G. P. CLAPP.
NAIL MACHINE.
(Application filed Jan. 26, 1901.)
(No Model.) 7 Sheets—Sheet 6.
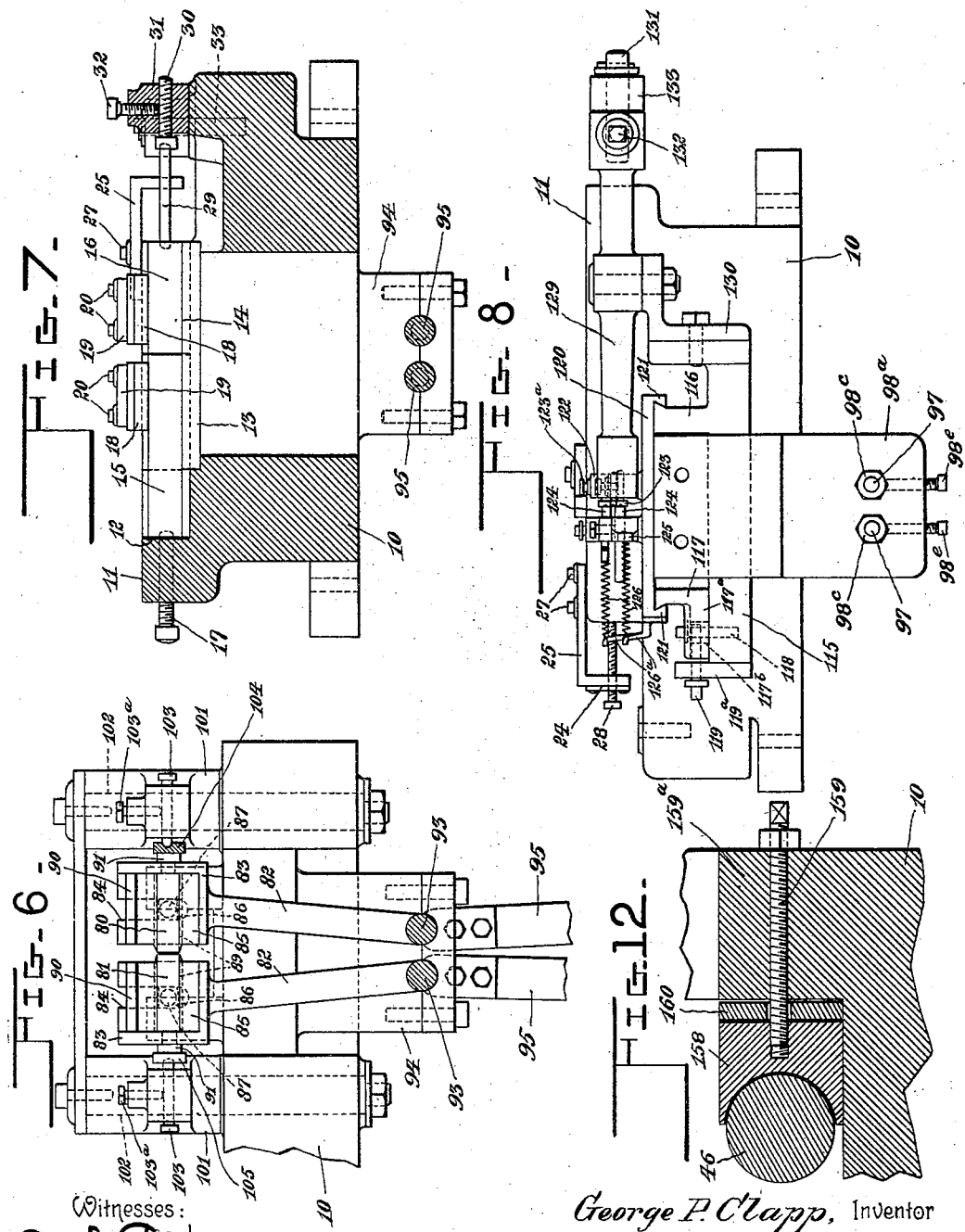
Witnesses:
George P. Clapp, Inventor
By Marion & Marion
Attorneys No. 685,104. Patented Oct. 22, 1901.
G. P. CLAPP.
NAIL MACHINE.
(Application filed Jan. 26, 1901.)
(No Model.) 7 Sheets—Sheet 7.
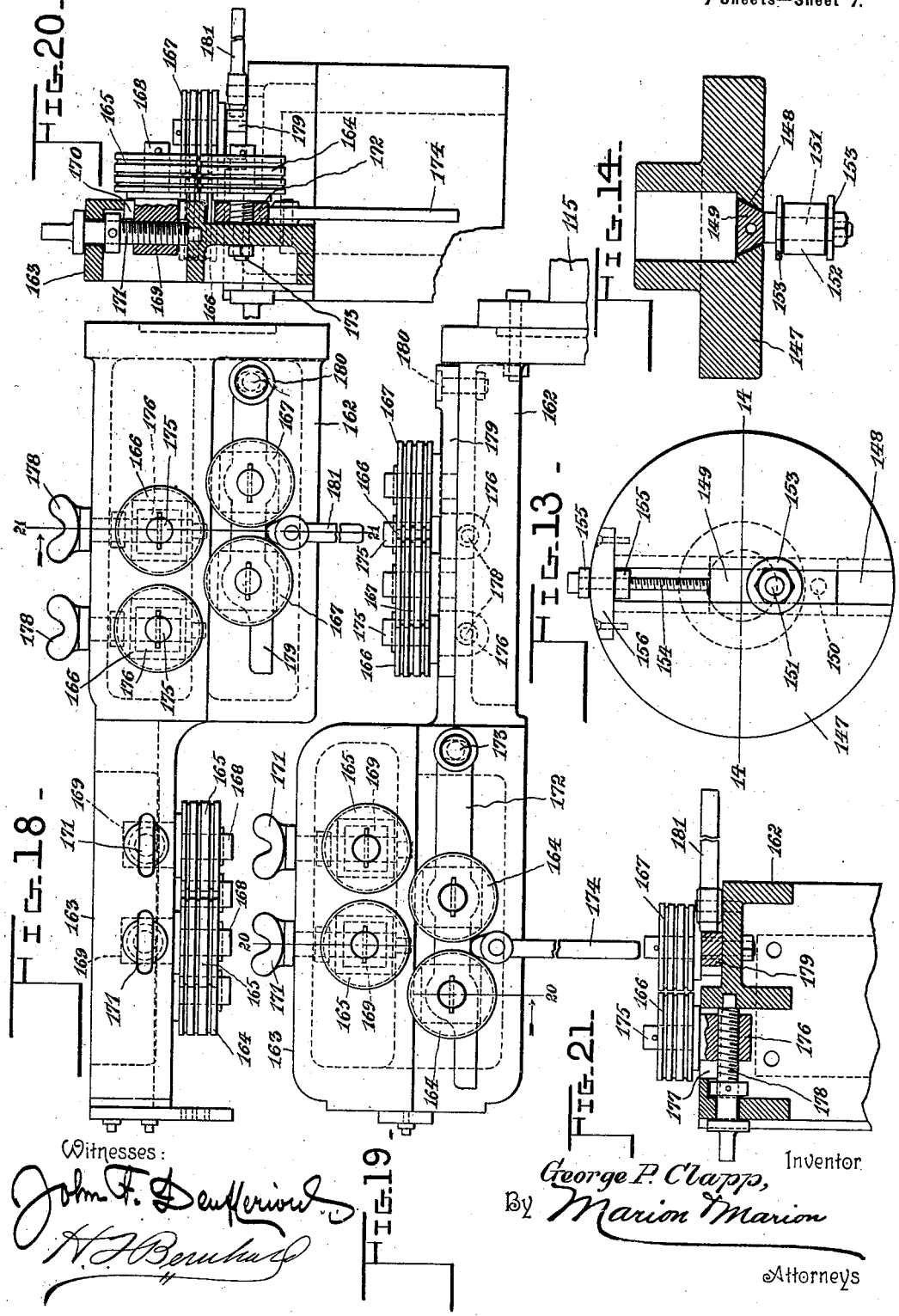
Witnesses:
Inventor
George P. Clapp,
By Marion & Marion
Attorneys

UNITED STATES PATENT OFFICE.

GEORGE PARKER CLAPP, OF MONTREAL, CANADA, ASSIGNOR OF ONE-HALF TO WILLIAM WALLACE NEAR, OF MONTREAL, CANADA.

NAIL-MACHINE.

SPECIFICATION forming part of Letters Patent No. 685,104, dated October 22, 1901.

Application filed January 26, 1901. Serial No. 44,335. (No model.)

*To all whom it may concern:*

Be it known that I, GEORGE PARKER CLAPP, a subject of Her Majesty the Queen of Great Britain, residing at the city and district of Montreal, Province of Quebec, Canada, have invented certain new and useful Improvements in Nail-Machines; and I do hereby declare that the following is a full, clear, and exact description of the invention, such as will enable others skilled in the art to which it appertains to make and use the same.

My invention relates to improvements in nail-machines of that class which produce nails automatically from one or more continuous lengths of wire; and the primary object of this invention is the production of a simple type of machine in which the parts operate under increased speed and with less friction and wear as compared with prior machines, whereby the capacity of the machine is materially augmented.

One of the important features of my machine is the provision of a feeder-driving mechanism in which the parts are so combined and organized that a limited period of rest or dwell is secured between the intervals of the forward thrust or feeding movement of such mechanism, whereby the nail-header is given an opportunity to clear itself and discharge the completed nails from the machine. Such feeder-driving mechanism also allows the cams which actuate the cutter and pointer die mechanism to be fashioned on easier operating lines, thereby reducing wear on the cams and other parts and permitting the machine to be operated at a high rate of speed.

Another important feature of my invention is an improved nail-header capable of a combined rising-and-falling movement in a vertical plane simultaneously with a back-and-forth reciprocation in a horizontal plane. Said header mechanism is of such novel organization that the embryo nails when pushed inward by the feed mechanism are free to pass under the header on the backward and upward movements thereof, so that the header on its reverse movement will deflect such nails and cause them to be discharged, thus making the header self-clearing in its action on the work and also dispensing with a separate clearer mechanism, which is ordinarily required in the operation of familiar types of machines. This header mechanism also allows less throw of the crank-pin on the main driving-shaft, thereby reducing the strain and wear.

Another important feature of my machine is an improved mechanism for actuating the gripper-dies which allows movement of the parts at a high rate of speed, insures the operation of the dies to secure a direct and positive grip on the wires, and necessitates a small movement of the cam, said cam being fashioned on comparatively easy curves, which, however, secure the operation of the gripper-dies in a manner to firmly grip the wire or wires while the cutting and pointing dies operate thereon, and said cam giving the highest grip or pressure on the wires during the severe strain thereon by the operation of the header.

Another feature of importance is the provision of thrust-blocks in adjustable relation to the main driving-shaft for insuring a perfectly-rigid shaft, reducing the liability of breakage by excessive strain, and taking up the wear due to severe and prolonged use.

Another feature connected with the gripper-die mechanism is an improved means for instantly retracting the movable die from the stationary die and for regulating the strength of the retracting-spring.

Other features associated with the cutter-die mechanism are, first, springs for normally holding the levers in contact with the cams; a self-adjusting thrust-pin between each die-moving lever and its complemental die-carrier arranged so as to compensate for the variation in the movement of these parts, and to fashion the working face of the lever-actuating cam in a manner to reduce the friction on a soft-metal cam-body and also allow for renewal of worn parts.

A further feature of my machine is in the feed mechanism having throw-off levers arranged for individual operation in a way to permit either of the wire-gripper devices to be thrown out of use, thus permitting the attendant to determine which of a series of grippers or the dies are defective and permitting ready inspection and repairs.

In the drawings hereto annexed, forming a part of this specification, Figure 1 is a plan view of a complete nail-making machine constructed in accordance with my invention. Fig. 2 is a similar plan view on an enlarged scale, omitting the straightening mechanism and showing certain plates removed over the gripper-die-actuating mechanism to more clearly illustrate the latter. Fig. 3 is a side elevation taken from the right-hand side of the machine shown by Fig. 2. Fig. 4 is a vertical longitudinal sectional elevation in the plane of the dotted line 4 4 on Fig. 2. Fig. 5 is a vertical transverse section through the machine in the plane of the irregular line 5 5 on Fig. 2 looking in the direction of the arrow and showing the header mechanism. Fig. 6 is another vertical transverse section taken in the plane of the dotted line 6 6 on Fig. 2 looking in the direction of the arrow and showing the cutter-die mechanism. Fig. 7 is another vertical cross-section through the machine, taken in the plane of the dotted line 7 7 on Fig. 1, looking in the direction of the arrow and illustrating the gripper-dies and the actuating mechanism therefor. Fig. 8 is an end elevation or front view of the wire-feed mechanism and with the straightening mechanism omitted. Fig. 9 is a longitudinal sectional elevation in the plane of the dotted line 9 9 on Fig. 2 looking in the direction of the arrow and illustrating a portion of the actuating mechanism for the gripper-die. Fig. 10 is a vertical transverse section through the eccentric, the rocker, and parts associated therewith, taken in the plane of the dotted line 10 10 on Fig. 2, looking in the direction of the arrow, said elements forming a part of the mechanism for actuating the reciprocating bed-plate of the wire-feed mechanism. Fig. 11 is a vertical transverse section through a part of the wire-feed mechanism and taken in the plane of the irregular line 11 11 on Fig. 2 looking in the direction of the arrow. Fig. 12 is an enlarged detail vertical section illustrating the operative relation of one thrust-block to the main driving-shaft, said section being taken in the plane of the line 12 12 on Fig. 2. Fig. 13 is an enlarged view looking at the front face of the eccentric which is carried by the main driving-shaft and which is arranged to actuate the rocker that drives the train of operative connections to the reciprocating bed-plate of the wire-feed mechanism. Fig. 14 is a transverse section on the line 14 14 of Fig. 13. Fig. 15 is an enlarged detail view of one of the cams adapted for the actuation of one lever for the cutter-die mechanism. Fig. 16 is a transverse section on the line 16 16 of Fig. 15. Fig. 17 is a perspective view, on an enlarged scale, of the rocker between the eccentric and the operative connections to the bed-plate of the wire-feed mechanism. Fig. 18 is a plan view, on an enlarged scale, of the straightener mechanism detached from the machine. Fig. 19 is a front elevation of the parts shown by Fig. 18. Fig. 20 is a cross-section on the line 20 20 of Fig. 19. Fig. 21 is another cross-section, taken on the line 21 21 of Fig. 18.

The same numerals of reference denote like parts in each of the several figures of the drawings.

10 designates the main frame of the machine, which is provided with a front transverse rail 11, the same having a longitudinal recess 12 in its rear edge. (See Fig. 4.) This recess receives a die-supporting plate 13, which is fitted flush with the frame-rail and is provided with a flange 14, the upper edge of which flange is beveled or inclined. (See Fig. 4.) This supporting-plate 13 receives the pair of coacting gripper-dies 15 16, the same being shown more particularly by Figs. 1, 2, 4, and 7, each having an under beveled edge which conforms to the bevel of the flange 14, whereby said gripper-dies are seated upon the flanged die-supporting plate. These dies are provided in their opposing ends with suitable grooves (not shown) adapted to form openings through which one or a series of wires are arranged to pass, said wires being engaged by suitable grippers on an automatic feed mechanism, to be hereinafter described. The gripper-die 15 is made adjustable in the die-supporting plate by a screw 17, which finds a suitable bearing in a threaded opening of the frame, said screw acting against the outer end of said die. (See Fig. 7.) A clamping-plate 18 rests upon each gripper-die, so as to assist in holding the latter to its proper place in the plate 13, said clamping-plate 18 being engaged by a strap 19, which is clamped in place by the bolts 20, said bolts serving to hold the plate 18 also in place, whereby the plate may be dismounted or removed when the bolts and the strap are released. The gripper-die 15 is intended to normally remain at rest, but the other gripper-die 16 is moved positively by die-actuating mechanism in order that the wire or wires may be firmly gripped and held in the intervals between the operation of the feed mechanism and while the header mechanism is acting against the end portions of the wires. With the movable gripper-die 16 is associated two sets of devices, one of which serves to automatically retract said die 16 from operative relation to the opposing die 15, while the other train of devices are adapted to exert very great power upon said movable gripper-die 16 at proper periods in the operation of the machine in order that the two gripper-dies may firmly hold the wire during the operation of heading the nails. The retracting mechanism for said movable gripper-die consists of a finger 21, which is arranged in a horizontal position at the left-hand side of the machine and is loosely received in a recess 22, which is formed longitudinally in the die-supporting plate 13. The inner end of this finger is provided with a nib 23, arranged to loosely engage with a recess formed in the front face of said die 16, while the outer end of said finger is attached or connected to a retracting-spring 24, the latter being represented by Fig. 2 in the form of a leaf-spring, which is fastened to a depending lug on an adjustable plate 25. (See Figs. 2 and 7.) Said plate is provided with a longitudinal slot 26, through which passes one or more clamping-bolts 27, and said lug of the plate supports an adjusting-screw 28, the latter bearing against the frame for the purpose of adjusting the plate when the bolts are loosened, whereby the plate may be adjusted toward or from the frame, so as to vary the tension of the spring 24.

The means for forcibly impelling the gripper-die 16 toward the companion die 15 includes a thrust-pin 29, the latter arranged in a horizontal position, so as to have its inner end socketed in a recess of the movable gripper-die 16. The outer end of this thrust-pin fits in a socket of the headed bearing-pin 30, the latter passing through a threaded opening which is provided in a lever 31 at a point intermediate the length of the latter and said bearing-pin being clamped in place to the lever by the screw 32. The lever is arranged in a horizontal position at the left-hand side of the frame, one end portion of said lever being loosely mounted on a fulcrum-arbor 33, which is held in the frame by a clamping-screw 34. This lever is contained in a housing 35, which is provided on the frame and which has its open upper side normally closed by a cap-plate 36, the latter being bolted to said housing in order that the lever may be inclosed and protected by parts of the main frame. Said lever 31 is bifurcated at its free end and provided with suitable bearings, as at 37, for the reception of the trunnions of a roller 38, the latter being thus journaled in the free end of the lever, so as to move therewith. Said roller rides against an inclined or wedge-shaped face 39, which is provided on the wear-plate 40, the latter being dovetailed into the thrust-slide 41. Said thrust-slide is loosely mounted in the housing 35 and a guide 42, said parts being arranged in alinement with each other, as shown by Fig. 2, in order that the thrust-slide may extend from the lever of the gripper-die mechanism to the gripper-actuating cam on the main driving-shaft. The thrust-slide is provided at its opposite end with a fork 43, in which is mounted the friction-roller 44, the latter arranged to ride directly against the periphery of said gripper-actuating cam 45, as shown more clearly by Figs. 2 and 9.

The main driving-shaft 46 extends entirely across the machine at one end thereof, the same being journaled in suitable bearings 47, which are provided on the main frame. The gripper-actuating cam 45 is peculiarly fashioned in order that it may release the thrust-slide from pressure when the feed mechanism is in operation for the purpose of advancing the wire or wires the proper length through the gripping-dies to initially exert pressure upon the thrust-slide when it is desired to make the dies 15 16 engage with the wire or wires sufficiently secure to prevent the backward movement of the wire or wires on the retraction of the feed mechanism, and finally said cam exerts its greatest pressure on the thrust-slide before the header mechanism acts against the wires to form the heads on the embryo nails, whereby the gripper-dies are made to so forcibly grip the wires under the great strain exerted by the header that it is not possible for the wires to move backward or give during the heading operation. To attain these ends, as well as to fashion the cam on easy lines, I give said cam three faces, which are indicated by the numerals 48 49 50 by Fig. 9 of the drawings. The face 48 is concentric with the axis of the shaft and constitutes the "let-off" face when the thrust-slide does not exert pressure upon the movable gripper-die. That part of the cam indicated by the numeral 49 forms the "come-on" face of the cam when the latter exerts its initial pressure against the thrust-slide, while the remaining portion 50 of the cam has the high part thereof by which the gripper-die 16 is made to coact with the companion die in a manner to exert the great pressure necessary to offer resistance to the header mechanism.

One end portion of the main driving-shaft 46 is extended beyond the frame for the reception of the balance-wheel 46$^a$ and the fast and loose pulleys 46$^b$, these parts being ordinary in machine construction. The other or right-hand end portion of the shaft is also extended beyond the frame for the reception of the crank-disk for operating the feed mechanism, as will be hereinafter described.

The thrust-slide 41 is normally impelled in a rearward direction by the agency of a spring 51, in order to hold the friction-roller 44 in peripheral contact with the gripper-actuating cam. Said spring 51 is shown by Fig. 9 as a bowed spring having one end portion thereof secured firmly to a part of the frame and its other free end engaging with a stud, pin, or projection 52, which is attached firmly to the thrust-slide 41. The spring is disposed normally out of the way of the operating parts of the machine, so as to have engagement only with the thrust-slide upon which it acts, and this spring is of special utility in that it keeps the friction-roller of said thrust-slide in engagement with the face of the cam which is presented to the slide.

I will now proceed to describe the header mechanism by which the end portions of the series of wires are upset in a manner to form heads on the embryo nails. The header mechanism which I have invented is distinctive in its nature as respects other machines known to me from the fact that it is positively and mechanically depressed to its working position by the forward and downward movement of the mechanism, whereas it is retracted from its operative position by an upward and rearward movement, thus entitling the header to be known as a "rising header." The header mechanism is furthermore advantageous in that it acts automatically as a clearer to positively depress any partially-cut nails out of its path when it moves in the forward and rearward direction to assume its operative position, thereby dispensing with a separate clearer mechanism.

The frame 10 is provided with parallel rails 54 55 between the crank-shaft and the gripper mechanism, and these rails are formed near their rear ends with longitudinal notches 56, which provide ways adapted for the reception of horizontally-slidable bearings 57, one of which is fitted in the way or slot of each rail. The two slidable bearings are connected by a transverse pivotal spindle or arbor 58, arranged in a horizontal position and idly mounted in the bearings, so as to serve as a pivotal connection between the header-block 59 and the pitman 64. The header-block 59 is arranged between the rails on the frame so as to extend longitudinally thereof and project in front of the pivotal shaft 58, the rear end of said header-block 59 being hung on and supported by the arbor 58, whereby the header-block is capable of swinging movement in a vertical plane and from the axis afforded by the arbor 58. The header-block 59 is provided with a longitudinal recess 60, which is enlarged at its rear portion to form the holes 61. The header 62 is fitted in this longitudinal recess, so as to have its rear portion extend into the hole 61, while its front portion extends a suitable distance beyond the front end of the header-block 59. The rear portion of the header-block is formed with an opening or recess 59$^a$, adapted for the reception of the front portion of the pitman 64, and this pitman has its rear portion connected in any approved way with the crank-pin 65, united to the collars 66 of the main driving-shaft, said collars and the crank-pin being forged or otherwise produced as an integral part of said shaft. The header 62 is held firmly in the recess of the header-block by the employment of a bifurcated clamp 67. (See Fig. 5.) This clamp has the legs 68 arranged to fit in suitable openings of the header-block and to be held securely in place thereon by means of a transverse bolt or bolts 69. The clamp straddles the header 62, and it furnishes a bearing for the binding-screw 70, which is mounted in a position to impinge the top edge of the header 62, whereby the clamp and the screw serve to firmly hold the header in position within the header-block. The header may be adjusted a limited distance with respect to the header-block by the employment of an adjusting-screw 70$^a$, the same finding a threaded bearing in the rear portion of the header-block and said screw having an enlarged portion or head, which is arranged in the hole 61 and is adapted to impinge the rear extremity of the header 62, as represented by Fig. 4, whereby on releasing the screw 70 the adjusting-screw 70$^a$ may be manipulated so as to advance or retract the header 62 with respect to the header-block 59.

As before indicated, the header is positively forced in a downward direction when it is impelled forwardly by the operation of the crank-shaft and the pitman. I will now proceed to describe the means by which said positive depression is given to the header-block and the header. The header-block is provided with the wear-plates 71, each having an inclined length 72, and said plates are secured firmly to the top edges of the header-block, on opposite sides of the longitudinal recess 60 therein, the inclined lengths 72 of said plates extending downwardly and forwardly, substantially as represented by Fig. 4. The depressing-rollers 73 are arranged to ride upon these wear-plates and the inclined lengths thereof, said rollers being disposed on opposite sides of the header, so as to lie out of the path of the clamp 67 and to be disposed in positions to normally ride upon said plates. The depressing-rollers are idly mounted upon horizontal spindles 74, which are held in vertical posts 75 by the binding-screw 76, and these posts are fitted in sockets 75$^a$ of the frame and are retained therein by the set-screws 75$^b$, as shown more clearly by Fig. 5. On the upward and rearward movement of the header-block and the header the blades 71 are withdrawn from beneath the rollers, and the inclined lengths thereof travel beneath the rollers, so as to permit the header-block to have rising motion; but when the header is forced in a forward direction by the crank-pin of the shaft the rollers ride upon the inclined lengths 72 of the plates, so as to positively depress the header until the plates themselves travel beneath the rollers, so that at the extreme limit of the forward movement of the header it is free to travel in a horizontal path for a very limited distance. The elevation of the header on its rearward movement is effected by the employment of a rising wedge 77, the same arranged at the under side of the header-block, near the free end thereof. (See Fig. 4.) This rising wedge is dovetailed into the under face of the header-block, and it is provided with a depending inclined lip 78, the same arranged at its front edge and adapted to travel upon a hardened wear-plate 79, which is secured on the rails 54 55 of the frame.

Lateral motion of the header-block 59 is minimized by the employment of a tightening-gib 113 in the form of a hardened steel plate, which is seated in a recess 113$^a$, formed in the guide-rail 54 of the frame. This gib bears laterally against one side of the header-block, and it is held in its operative position by the employment of screws 114, the same having suitable bearings in the rail 54 and engaging with the tightener-gib for the purpose of adjusting the same toward and in engagement with the header-block.

I will now proceed to describe the dies for cutting and pointing the nails, together with the means for supporting and actuating said dies. The cutting and pointing dies and their mountings are disposed in such a way that said dies will work very close to the rear faces of the gripper-dies 15 16, said cutting and pointing dies disposed in a plane between the gripper-dies and the header, and, furthermore, said cutting and pointing dies being adapted for movement toward and from each other in a path parallel to the movement of the movable gripper-die, and such movement of the pointing and cutting dies being in a plane at right angles to the path of reciprocation of the header.

The cutting and pointing dies 80 81 are mounted individually in the die-carriers 82. (See Fig. 6.) Each die-carrier is provided with an annular head 83, in one side of which is produced a vertical slot 84, the latter adapted to receive a die-supporting plate 85, which is provided on its rear face with a rib 86 and with a stem 87, and the rib of each die-plate fits in the slot of the die-carrying head, so as to hold the plate against any tendency to turn therein, and said plate is clamped in position by a nut 88, which is screwed on the rear end of the stem 87. (See Fig. 4.) Said die-carrying plate is provided in its front face with a dovetailed groove 89, adapted to receive the die 80 or 81, and between the top edge of the die and the top edge of the plate 85 is interposed a filling-plate 90. The die may be given an endwise adjustment in the grooved plate 85 by a screw 91, the same being mounted in one side of the die-carrier head, so as to leave the head of the screw exposed for a self-adjusting thrust-plate to bear against said screw-head, as will presently appear. The die-carriers 82 are firmly mounted upon horizontal rock-shafts 93. (See Figs. 3, 4, 5, and 6.) These rock-shafts are journaled in hangers 94, which depend from the main frame, and the shafts are provided at their inner ends with the downwardly-extending arms 95, the same being attached to the coiled retracting-springs 96. Said springs are connected at their outer ends to the bars 96ª, which are mounted on the frame in a suitable way. (See Fig. 5.) The rock-shafts and the die-carriers may be given a limited endwise adjustment for the purpose of bringing said die-carriers and the cutting and pointing dies in proper operative relation to the gripper-dies. This adjustment is attained by the employment of an adjusting-rod 97 for each rock-shaft, one end of said adjusting-rod being screw-threaded, so as to have threaded engagement with an internal socket provided in the forward end of the rock-shaft, as indicated by Fig. 3, said threaded end of the adjusting-rod being provided with a check-nut 97ª, adapted to screw against the end of the rock-shaft. The other threaded end of the adjusting-rod 97 is received in an externally-threaded bushing 98, the same having threaded engagement with a female-threaded opening in a lug 98ª, which is provided on the frame. The adjusting-rod 97 is held immovable in the adjusting sleeve or bushing in so far as respects movement of one part relative to the other by the use of the check-nuts 98ᵇ and 98ᶜ, the same being screwed on the outer threaded end of the adjusting-rod, so as to lie on opposite sides of the threaded bushing. This bushing is provided with a squared or hexagonal portion 98ᵈ, adapted for the application of a wrench or other implement by which the bushing may be rotated, so as to give an endwise movement thereto relative to the lug 98ª, and this movement of the bushing is transmitted by the nuts to the adjusting-rod, so as to secure a like adjustment of the rock-shaft. As each rock-shaft is associated with an adjusting device such as described, it is evident the die-carriers may be given a limited movement toward or from the gripper-dies, so as to proper position the cutting and pointing dies relative to said gripper-dies. Each revoluble adjusting sleeve or bushing 98 is held against accidental rotation by a binding-screw 98ᵉ, the same having a suitable bearing in the lug 98ª to impinge said sleeve or bushing, all as more clearly shown by Fig. 3.

The cutting and pointing dies are operated positively by the levers 101, the same arranged in horizontal positions and extending longitudinally of the frame on opposite sides of the header mechanism. (See Figs. 1 and 2.) Each lever is fulcrumed at a point intermediate of its length, as at 102, so as to provide long and short arms, and the short arm of each lever carries a thrust-pin 103. The same extends transversely through the lever and adapted to be held in place by a suitable binding-screw 103ª. The inner ends of said thrust-pins 103 on said lever 101 are socketed in thrust-plates 104 105, the same arranged to bear against the heads of the adjusting-screws 91, which engage with the ends of the cutting and pointing dies, as represented by Fig. 6. These thrust-plates are thus connected loosely with the thrust-pins, and they are free to have a limited movement with relation to the screws 91, thus forming a compensating connection between the levers and the die-carriers, so as to always maintain an operative relation of the parts and compensate for the difference in the movements of the die-carriers and the levers.

The levers 101 are provided at their rear ends with friction-rollers 106, which are idly mounted on said levers in any approved way, and these rollers are arranged to ride against the lateral cutter-actuating cams which are provided on the collars 66 of the crank-shaft. Each collar 66 of the main driving-shaft is provided on its face that lies away from the crank-pin with an annular recess 107ª, in which is seated a cam-ring 107, the latter being provided on its inner side with a lug or projection 108, that fits in a deeper and smaller recess 108ª of the collar 66, said cam-ring and its lug being attached securely to the collar by bolts or screws 109. The cam-ring is provided with a cam projection 110 of any suitable length and form for the actuation of the levers 101, and these cam projections of the two cam-rings on the collars are disposed in corresponding positions for the purpose of simultaneously actuating the die-carriers of the cutting and pointing dies. The rollers 106 of the cutter-actuating mechanism are held normally in engagement with the cam-rings or the projections thereof by springs 111. Each spring is preferably in the form of a leaf-spring secured by bolts to a lug 112 on the frame and with its free end in engagement with the lever, said spring occupying a position to normally force the roller 106 against the cutter-actuating cam. The cam projections of the cutter-actuating cams are so positioned on the main driving-shaft that they will actuate the cutting and pointing dies alternately with respect to the header, which is also driven from the main driving-shaft through the agency of the crank-pin 65, and thus on retraction of the header the cutting and pointing dies are moved positively toward each other for the purpose of acting on the wires which have previously been operated upon by the header for the purpose of forming the heads on the embryo nails. On the advancement of the wires by the feed mechanism after the cutting and pointing dies shall have operated on said wires the gripper-dies are separated and the cutting and pointing dies are likewise separated, so that the wires may be moved the proper distance by the feed mechanism, these movements of the parts taking place during the retraction of the header or while it is in an inoperative position.

I will now proceed to describe the feed mechanism by which the series of wires are positively advanced after the pointing and cutting dies shall have acted thereon, and this feed mechanism is situated at the front part of the frame and in advance of the gripper-dies.

The feed mechanism contemplates the employment of a stationary bed 115, which is preferably bolted to the front part of the frame, and this bed is provided with two rails 116 117. The rail 116 is permanently fast with the bed by casting or otherwise, forming the same as an integral part thereon; but the other rail 117 is adjustably mounted on the bed, so as to be shiftable laterally with respect to the permanent rail, with which it is arranged at all times in parallel relation. Said shiftable rail is provided with a lateral flange 117ª, having suitable slots 117ᵇ, through which are passed the clamping-screws 118. The rail is adjusted by the manipulation of transverse adjusting-screws 119, which are loosely fitted in upstanding lugs 119ª on the bed, said screws having threaded engagement with the flange of the shiftable rail, as shown by Fig. 11, so that the latter may be accurately adjusted by turning the adjusting-screws. The wire-grippers of the feed mechanism are mounted on a slidable bed-plate 120, arranged in a horizontal position over the rails 116 117 and provided at its side edges with parallel flanges 121, which have dovetailed engagement with said rails, whereby the bed-plate is mounted upon the bed in a manner to slide freely back and forth thereon. This bed-plate is provided with a series of posts 122, each of which receives the shank of a grooved face-plate 123, the same being clamped firmly to the post by a screw 123ª, (see Fig. 11,) said plates each being provided with a groove and the series of face-plates being so arranged that the wires may individually pass therethrough. Opposite to each grooved face-plate is a pointed stem 124, which is carried by a lever 125, that is fulcrumed on the bed-plate, the other end of said lever being engaged by a spring 126, that has its outer end attached to a bracket-arm 126ª, also as shown by Fig. 11. The energy of the spring keeps the stem of the lever against the wire which is fitted in the groove of the face-plate, so that the wire is gripped sufficiently tight to be advanced when the bed-plate is positively reciprocated by the feeder-actuating mechanism. One of the improvements which I have made in the feed mechanism is the employment of a throw-off lever 127 in connection with each gripper-lever. Hence a series of throw-off levers corresponding in number to the gripper-levers are employed, one throw-off lever being in operative relation to each gripper-lever. Each throw-off lever is pivoted to the bed-plate in such relation to the gripper-lever that the nose of the throw-off lever may ride against the gripper-lever when the parts occupy the position shown by Fig. 2, thereby making the lever 127 move the lever 125 to a position where the gripper-stem releases the wire, notwithstanding the tension of the spring. These throw-off levers acting individually on the gripper-levers enable any one or more of the wires to be disengaged from the feed mechanism, so that the latter will not advance the wire. By this arrangement of parts the machine attendant is able to individually inspect the nails produced by the individual wires, so that if one of the dies does not act properly the defective die may be easily detected previous to repairs. The slidable bed-plate is positively actuated by a feeder-lever 129, which is fulcrumed to an offstanding bracket 130, bolted to the bed. The outer end of said lever receives a wrist-pin 131, which is held firmly to the lever by a screw 132, and on this wrist-pin is loosely fitted a clip 133, to which is pivoted the front end of the pitman 134, the latter extending rearwardly to the main driving-shaft.

135 designates a coupling having a forked rear end and a socketed front end, as shown by Fig. 3, said socket being internally screw-threaded. The rear end of the pitman 134 is reduced and threaded so as to produce a stem 136, which is screwed into the threaded socket of the coupling, the stem also having a nut 137 to prevent accidental unscrewing of the parts. The forked or bifurcated rear end of the coupling forms a jaw 135ᵃ, in which are mounted the center screws 138, disposed in alinement with each other, as shown by Fig. 3, and having pointed ends which are fitted in the sockets of a sleeve 139, which is mounted loosely on a pin 139ᵃ, firmly secured to lugs 140, which are integral with a rocker 141. This rocker is one of the important features of the feeder-actuating mechanism. It is cast or otherwise formed in a single piece of metal, the lower end of said rocker being loosely fitted on an arbor or shaft 142, which is clamped in the frame, as shown by Fig. 10. The rocker is arranged in a substantially upright position alongside of the frame, so that it may be operatively connected with a variable-throw eccentric, and said rocker is provided with a longitudinal slot 143, having inclined or curved faces 144 on opposite sides of the central line, whereby the end portions 145 146 of the rocker are out of alinement one with the other.

147 designates the crank-disk of the variable-throw eccentric, the same being firmly secured to an end portion of the main driving-shaft, said crank-disk having a diametrical dovetailed guideway 148 formed in one face thereof. (See Figs. 13 and 14.) In this guideway is fitted a slide 149, adapted to be held in place at any point within the guideway by a single screw 150, that is mounted in the rear side of the eccentric and is adapted to impinge the slide. Said slide is also provided with a crank-pin 151, which receives the sleeve 152 and the collars 153, said sleeve fitting snugly in the slot 143 of the rocker to insure the easy movement of the crank-pin and the rocker with relation one to the other, while the collars 153 embrace the lateral faces of the rocker to minimize lateral movement of the parts. The crank-pin slide is adjusted by the manipulation of a screw 154, which has threaded engagement with a tapped opening in the slide, said screw having the collars 155 disposed on opposite sides of a bearing-plate 156, the latter being attached to an edge portion of the crank-disk, so as to occupy a flush relation thereto. The employment of the slide having the crank-pin and the means for adjusting said slide enables the position of the crank-pin relative to the axis of the crank-disk to be changed, so as to vary the throw of the eccentric, whereby the feed mechanism may be controlled to change the length of the material fed at each movement of the bed-plate, thus regulating the length of the nails. The rocker is positively actuated by the crank-pin of said eccentric, and when the rocker moves in one direction the pitman and the feeder-lever move the slidable bed-plate in an opposite direction, thus positively actuating the grippers to advance the wires. In the retracted position of the bed-plate the crank-pin is in one portion 146 of the slot in the rocker; but on the rotation of the disk and the crank-pin it passes from the portion 146 into the portion 145 of the slot in said rocker, at which time the position of the bed-plate is reversed. During the travel of the crank-pin through the slot in the rocker the roller of said pin rides against the faces 144 of the slot, which faces 144 are peculiarly formed, so as to allow a brief period of rest or dwell during the movement of the crank-pin, as described. This period of rest or dwell is advantageous in my machine, because the feed mechanism is momentarily arrested in order to give the header a chance to clear itself. Furthermore, this operation of the feeder mechanism does not require the cams of the cutter-actuating mechanisms to be made on such sharp lines, which overcomes sudden movement of the parts. Hence the cutter-actuating cams can be made on easier lines, which reduces the wear on the cams and the rollers and on the whole results in increased speed in the operation of the machine.

The straightener mechanism used in connection with the machine lies in front of the feed mechanism. (See Fig. 1.) This straightener mechanism contemplates the employment of a frame or bracket-plate consisting of horizontal and vertical members 162 163, the latter having its rear end portion bolted to the front of the stationary bed for the feed mechanism. The frame member 163 supports a plurality of vertical rolls, two of which, 164 164, are loosely supported on a pivoted carrier 172, the latter being pivoted at 173 to said frame member. This carrier is held in a raised position by a lever 174. The other rolls 165 are individually mounted on spindles 168, which are attached to slidable blocks 169, fitted in slots 170, formed in the vertical frame member, and with these blocks are engaged the adjusting-screws 171, which are loosely mounted in the frame member and have threaded engagement with the blocks. On the horizontal frame member are supported two series of horizontal rolls. The rolls 166 of one series are individually mounted on the spindles 175, which are attached to horizontally-slidable blocks 176, which are loosely fitted in slots 177, provided in said horizontal frame member 162. These blocks and the rolls are adjusted by the screws 178, which are loosely mounted in the frame member 162, whereby the rolls 166 may be individually adjusted. Other rolls 167 are idly mounted on a pivoted carrier 179, the same being pivoted at 180 to the horizontal frame member and held in its working position by a lever 181.

The rollers constitute the horizontal and vertical series heretofore described, which are arranged quite close to the line of feed of the wires into the machine, each roller having a number of annular grooves corresponding to the number of wires which are to be fed to the machine. The rolls of each group are disposed to act on the wire in a way to take out the curve which exists therein owing to its having been coiled on a reel or any other condition, thus enabling the wires to be spread in a straight condition to the gripper mechanism. The wires pass through openings provided in a series of grooved guide-blocks 182, which are seated in a recess 183 of the transverse rail 11 of the machine-frame. (See Fig. 4.) These blocks are held in place by a plate 185, which is secured by bolts to the frame.

From the foregoing description, taken in connection with the drawings, it will be seen that the main driving-shaft serves to actuate all the parts of the machine, because it carries the cam 45, that impels the gripper-actuating devices. It carries the eccentric operating the feed mechanism. Its collars 66 are provided or formed with the cams 110, moving the levers of the cutter and pointing die mechanism, and its wrist-pin 65 impels the header mechanism. The cams for the cutter and pointing die mechanism and the crank-pin for the header mechanism are located on that part of the shaft between the shaft-bearings of the frame. Hence the shaft is subjected to very great strain at its middle portion. To minimize this strain and to render the main shaft firm and rigid in its bearings, I have provided the thrust-blocks 158, which are disposed in operative relation to the shaft and on opposite sides of the crank-pin. Each thrust-block is concaved to partially embrace the shaft, as shown by Fig. 12, and with this thrust-block engages a horizontal adjusting-screw 159, which is loosely supported in a bearing-lug 159ª on the frame. A hardened-steel set-plate 160 is interposed between the thrust-block and the frame-lug 159ª, said set-plate being engaged by two or more screws 161, whereby the thrust-blocks may be adjusted to compensate for wear on the shaft and the blocks themselves and to always maintain the shaft rigid and firm in its bearings.

The pitman 134 of the feeder-actuating mechanism is connected by a universal joint to the lever 129 and by a similar joint to the variable-throw eccentric. The first-named universal joint is provided by the employment of a clip 133, having a loose connection with the lever 129 and a pivotal connection to the pitman 134. The universal-joint connection between the opposite end of the pitman and the rocker is obtained by the sleeve 139, loosely carried on the front side of the rocker, and by the screws which pivotally connect the sleeve to the coupling, the latter being fast with the rear end of the pitman. These universal joints compensate for the difference in the plane of movement of the rocker and the feeder-lever, while at the same time the parts are kept in their operative relation for the proper transmission of motion from the variable-throw eccentric to the bed-plate of the feed mechanism.

In operation power is applied to the main driving-shaft through the fast pulley, and this shaft propels the several eccentrics and cams for the purpose of driving all the mechanisms of the machine, the parts being so formed and arranged that the nail forming and feeding mechanism will operate synchronously. The vibration of the rocker makes the feeder-lever move back and forth to impart the reciprocatory motion to the slidable bed-plate, which carries the gripper for the wire or wires to be fed to the nail-forming mechanism, the length of the stroke of the feed mechanism being regulated by proper adjustment of the crank-pin slide. On the movement of the slidable bed-plate to advance the wires the gripper-dies are open, the header is retracted or moved to the rear, and the cutter and pointer dies are separated laterally. The come-on face of the cam 45 now impels the thrust-slide, so as to move the lever 31 and make the thrust-pin impel the movable die 16 toward the companion gripper-die 15, thereby making the two dies coöperate in gripping the wires with sufficient force to prevent the wires from being drawn rearwardly on the reverse movement of the grippers and other parts of the feed mechanism. The cam projections 110 of the cutter-actuating cams now become operative to actuate the levers 101 and move the thrust-pins thereof inwardly, so as to simultaneously force the two die-carriers toward each other, whereby the cutter-dies operate on the wires to sever the nails therefrom, the nails having been headed previous to the movement of the feed mechanism. The high part of the cam 45 acts on the thrust-slide to make the gripper-dies firmly engage with the wires, and as the cutter-dies recede from the wires the header is positively and forcibly impelled in a forward and downward direction to make the header operate against the ends of the wires for the purpose of forming the heads on the nails, the wires being held by the gripper-dies at this period under the strongest grip, so that the wires cannot move backward. The header now moves backward and upward, so as to be drawn back out of the way of the wires, when they are again advanced by the movement of the feed mechanism in the manner hereinbefore described, and these several operations are repeated in the order described for the manufacture of the nails from lengths of wire rapidly and economically.

Although I have shown my machine as constructed for three wires simultaneously to the nail-forming mechanism, I do not limit myself to the number of wires which may be supplied to the machine, nor do I strictly confine myself to the employment of all the several mechanisms, because parts of the machine may be used without the whole.

I desire to call special attention to the operation of the feeder-actuating devices, in which the rocker having the peculiarly-formed slot 143 plays an important part, because said rocker allows the limit period of dwell, rest, or "still motion" in the service of the feed mechanism. This gives the header a chance to clear itself, does not require the cutter-cams to be so sharp and work suddenly, permits the cams to be fashioned on easier lines, reduces the wear on the parts, and on the whole results in increased speed.

The actuating mechanism for one gripper-die allows rapid movement of the parts, having an important effect in the working of the machine. This mechanism requires a small movement or throw of the cam 45, entirely omits the presence of a spring in the successful operation of the parts, and insures a direct grip of the gripper-dies on the wires.

In the header mechanism the lifter-wedge positively raises the header, so that the nails will pass the latter, and on the return movement of the header the latter acts as a clearer to deflect any nails which may remain in its path, thus dispensing with a separate clearer. The header mechanism also requires a short movement or throw of the crank-pin.

Changes within the scope of the appended claims may be made in the form and proportion of some of the parts, while their essential features are retained and the spirit of the invention is embodied. Hence I do not desire to be limited to the precise form of all the parts as shown, reserving the right to vary therefrom.

Having thus described my invention, what I claim as new is—

1. In a nail-making machine, a header mechanism comprising a header-block having a header projecting therefrom, depressing-wedges carried by the header-block on opposite sides of the header therein, and spaced rolls mounted on stationary supports and in the path of the depressing-wedges, whereby the wedges are adapted to ride against the rolls and the header is positively depressed as it approaches the operative position, substantially as described.

2. In a nail-making machine, a header mechanism comprising a recessed header-block, a header therein, a clamp straddling the header and secured to the header-block, depressing-wedges on the header-block on opposite sides of the header and its clamp, and rolls mounted on stationary supports and disposed in the path of said wedges, substantially as described.

3. In a nail-making machine, a header mechanism comprising a recessed header-block, a header seated therein, a forked clamp straddling the header and entering the header-block, a transverse fastener engaging the legs of said clamp and the header-block, depressing-wedges secured to the header-block on opposite sides of the clamp, and rolls mounted in the path of said wedges, substantially as described.

4. In a nail-making machine, a header mechanism comprising a recessed header-block, a header, a forked clamp straddling the header and having its legs secured to the header-block, an adjustable clamping element mounted in said forked clamp and engaging with the header, depressing-wedges fastened to the header-block on opposite sides of the clamp, and rolls disposed in the path of the wedges and adapted to depress the header downwardly, substantially as described.

5. In a nail-making machine, a header mechanism comprising a recessed header-block, a header, a forked clamp secured to the header-block and straddling the header, an adjusting and thrust screw arranged in the header-block in alinement with the header and adjustable in an endwise direction to impart like movement to the header with relation to the forked clamp, a set-screw mounted in the forked clamp and binding upon the header, and means for actuating the header-block, substantially as described.

6. In a nail-making machine, a header mechanism comprising a header-block, a header seated therein, a forked clamp attached to the header-block and straddling the header, depressing-wedges secured individually to the header-block and disposed on opposite sides of the forked clamp, stationary arbors secured on the machine-frame, depressing-rolls idly mounted on said arbors and disposed in the path of the wedges, and means for giving reciprocatory motion to the header-block, substantially as described.

7. In a nail-making machine, a rising header mechanism comprising a header-block, means for reciprocating the same, a header carried thereby, a forked clamp on the header-block and embracing the header and provided with a binding-clamp, depressing-wedges on the header-block on opposite sides of the header, rolls mounted in the path of said wedges, and means for raising the header-block, substantially as described.

8. In a nail-making machine, a rising header mechanism comprising a pivoted header, a rising wedge having an inclined lip and dovetailed to the header, and a plate upon which the inclined lip is adapted to ride, substantially as described.

9. In a nail-making machine, the combination with a header mechanism, a cutter mechanism, and a feeder mechanism, of gripper-dies, means for normally opening the gripper-dies, and a gripper-die-actuating mechanism for closing the said dies in advance of the action of the header mechanism and including a two-period cam, a lever having means for connecting the same with one of said dies, and a thrust-slide normally held in the path of the cam and also engaging with the lever to vibrate the latter on its fulcrum, substantially as described.

10. In a nail-making machine, the combination with a feed mechanism, and nail-forming devices, of coöperating gripper-dies, a thrust-slide disposed in operative relation to one of said gripper-dies, means for retracting the said die, and a two-period cam operatively related to the thrust-slide, substantially as described.

11. In a nail-making machine, the combination with a feed mechanism, and nail-forming devices, of coöperating gripper-dies, a thrust-slide carrying a wedge, a lever actuated by the thrust-slide and having operative connection with one gripper-die, and a two-period cam for operating the thrust-slide, substantially as described.

12. In a nail-making machine, the combination with a feed mechanism, and nail-forming devices, of coöperating gripper-dies, means for automatically retracting one of said dies, a two-period cam, and a train of operative connections between said cam and the retracted gripper-die for moving the latter positively under gradually-increasing pressure to make the two dies have a direct grip on the work, substantially as described.

13. In a nail-making machine, the combination with a feed mechanism, and nail-forming devices, of coöperating gripper-dies, a two-period cam, a thrust-slide operatively related to the cam and having a wedge, a lever having a shoe riding upon the wedge, and connections between the lever and one of the gripper-dies, substantially as described.

14. In a nail-making machine, the combination with a feed mechanism, and nail-forming devices, of a pair of coöperating gripper-dies, means independent of the die-retracting devices for positively moving one of said dies in a horizontal path with relation to the other die, a die-supporting plate having a dieway or groove and a longitudinal recess, a retractor-finger connected with said die and fitted slidably in said recess of the die-supporting plate, and a leaf-spring connected to the finger to normally retract the die, substantially as described.

15. In a nail-making machine, the combination with a pair of coöperating gripper-dies, and means independent of the die-retracting devices and adapted to positively actuate one of said dies, of a retractor-finger connected with said die, a spring connected to the finger to normally exert tension on the latter for retracting the die when free from the pressure of the positive actuating mechanism, and a plate connected to the spring and fastened adjustably to the machine-frame and adapted to change the relation of the spring so as to vary the tension thereof, substantially as described.

16. In a nail-making machine, the combination with nail-forming mechanism, and a main driving-shaft, of a feed mechanism, and feeder-actuating devices including a cam-formed rocker driven by said shaft and a train of devices actuated by the cam-surface of said rocker, the feed mechanism to secure a limited period of rest, dwell or "still" motion at each working period of the feed mechanism, as and for the purposes described.

17. In a nail-making machine, the combination with nail-forming mechanism, of a feed mechanism, and means for actuating said mechanism and including a rocker having a cam that permits a limited period of rest or dwell in the feed mechanism at each operation thereof, substantially as described.

18. In a nail-making machine, the combination with a header mechanism, a gripper mechanism, and a cam-actuated cutter and pointer mechanism, of a feed mechanism for the wire or wires, and an actuating mechanism for said feeder including a cam-slotted rocker operatively connected to a moving part of the feed mechanism and driven by a crank-pin in a manner to allow a limited period of rest or dwell in the operation of said feed mechanism, substantially as described.

19. In a nail-making machine, the combination with a crank-pin on a driving-shaft, and a reciprocatory bed having work-gripper mechanism, of a cam-slotted rocker connected with said crank-pin, and a pitman and lever connecting the rocker with said bed, substantially as described.

20. In a nail-making machine, the combination with a crank-pin on a driving-shaft, and a slidable bed-plate having work-gripper devices, of a rocker mounted independently of the crank-pin and having a cam-slot in which the opposite portions thereof are out of alinement and joined by intermediate curved or inclined faces, and connections between the rocker and the slidable bed, substantially as described.

21. In a nail-making machine, the combination with a crank-pin on a driving-shaft, and a slidable feeder bed-plate carrying suitable work-grippers, of an independently-hung rocker having a cam-slot, the opposite portions of which are out of alinement and which slot receives the crank-pin that is free to move therein for positively vibrating the rocker, a pitman having universal connection with the rocker, and a lever between the pitman and the slidable bed, substantially as described.

22. In a nail-making machine, the combination with a crank-pin on a driving-shaft, and a slidable feeder bed-plate carrying work-grippers, of a rocker having a cam-slot and connected with said crank-pin, a lever connected with the bed, and a pitman connected by universal joints with the rocker and with the lever, substantially as described.

23. In a nail-making machine, a work-feed mechanism having suitable grippers comprising fixed and pivoted members, springs connected individually to said members and normally moving the same away from operative relation to the fixed members, and throw-off devices arranged to engage individually with the pivoted gripper members and thereby maintain the latter in operative connection with the fixed gripper members, substantially as described.

24. In a nail-making machine, a feed mechanism having grippers each comprising fixed and pivoted members normally held out of operative relation by a pressure element, and throw-off levers in operative relation individually to said pivoted gripper members and adapted for manual adjustment to release said pivoted gripper members and permit the pressure elements to quickly move the pivoted gripper members out of working positions, substantially as described.

25. In a nail-making machine, a feed mechanism comprising a bed-plate or carrier, a series of grippers each having a fixed member and a spring-actuated member and said grippers normally held in open or inoperative conditions and arranged to individually engage with the work, and a series of throw-off levers each mounted separately and arranged in position to engage with one of the spring-actuated gripper members and to positively hold the latter in coöperative relation to its fellow gripper member, substantially as described.

26. In a nail-making machine, the combination with a movable bed-plate or carrier, and a gripper mounted thereon and having members, one of which is movable with respect to the other, of a spring connected to the movable gripper member to normally separate it from the other gripper member, and a throw-off lever pivoted on the bed-plate in position for engagement with the movable gripper member and adapted to positively hold it in coöperative relation to the other gripper member, substantially as described.

27. In a nail-making machine, the combination with die-carriers having cutter-dies, and levers for actuating said carriers, of thrust-pins movable with the levers, and self-adjusting plates engaging individually with the thrust-pins and each mounted on one die-carrier to move freely thereon in a path parallel to the face of the die-carrier, substantially as described.

28. In a nail-making machine, the combination with die-carriers having cutter and pointer dies, and cam-actuated levers for operating said die-carriers, of thrust-pins on the levers, and self-adjusting plates having socketed connection with the thrust-pins and bearing against the die-carriers and having free slidable movement relative thereto, substantially as described.

29. In a nail-making machine, the combination with nail forming and feeding mechanisms, of a main driving-shaft having centrally-arranged crank-pins and eccentrics for actuating all of said mechanisms, thrust-bearings engaging with said shaft between its bearings and the crank-pin, means for adjusting the thrust-bearings, set-plates engaging with the thrust-bearings, and means for holding the set-plates against movement, substantially as described.

30. In a nail-making machine, a crank-disk carried by the main shaft and provided with a guideway and with a fixed plate, a crank-pin slide in the guideway, a clamping-screw mounted in the disk and engaging with the slide, and a screw fitted in the plate and having threaded engagement with said slide, combined with a rocker operated by the crank-pin, and a feed mechanism propelled by the rocker, substantially as described.

In witness whereof I have hereunto set my hand in the presence of two witnesses.

GEORGE PARKER CLAPP.

Witnesses:
T. MYNARD,
JOHN F. DEUFFERWIEL.